US010430681B2

(12) United States Patent
Wang et al.

(10) Patent No.: US 10,430,681 B2
(45) Date of Patent: Oct. 1, 2019

(54) CHARACTER SEGMENTATION AND RECOGNITION METHOD

(71) Applicant: GRG Banking Equipment Co., Ltd., Guangzhou, Guangdong (CN)

(72) Inventors: Weifeng Wang, Guangdong (CN); Xinhua Qiu, Guangdong (CN); Rongqiu Wang, Guangdong (CN); Kun Wang, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 138 days.

(21) Appl. No.: 15/549,126

(22) PCT Filed: Jun. 26, 2015

(86) PCT No.: PCT/CN2015/082438
§ 371 (c)(1),
(2) Date: Aug. 4, 2017

(87) PCT Pub. No.: WO2016/127545
PCT Pub. Date: Aug. 18, 2016

(65) Prior Publication Data
US 2018/0096216 A1 Apr. 5, 2018

(30) Foreign Application Priority Data
Feb. 13, 2015 (CN) .......................... 2015 1 0083858

(51) Int. Cl.
*G06K 9/34* (2006.01)
(52) U.S. Cl.
CPC ............. *G06K 9/344* (2013.01); *G06K 9/346* (2013.01); *G06K 9/348* (2013.01); *G06K 2209/01* (2013.01)

(58) Field of Classification Search
CPC ........ G06K 9/344; G06K 9/346; G06K 9/348; G06K 2209/01
(Continued)

(56) References Cited

U.S. PATENT DOCUMENTS 6,356,655 B1 3/2002 Sumikawa et al.
6,473,517 B1 10/2002 Tyan et al.
(Continued)

FOREIGN PATENT DOCUMENTS

CN 101901333 A 12/2010
CN 102722733 A 10/2012
(Continued)

OTHER PUBLICATIONS

International Search Report for Application No. PCT/CN2015/082438 dated Nov. 16, 2015.
(Continued)

*Primary Examiner* — Daniel G Mariam
(74) *Attorney, Agent, or Firm* — Wolf, Greenfield & Sacks, P.C.

(57) ABSTRACT

Provided is a character segmentation and recognition method. The method includes: collecting image data to obtain a to-be-recognized image; positioning a character line candidate region on the to-be-recognized image; obtaining pre-set character line prior information, where the character line prior information includes the number of characters, character spacing and a character size; obtaining a corresponding segmentation point template based on the character line prior information; obtaining credible degrees of different positions on the character line candidate region traversed by the segmentation point template; determining a position with the highest credible degree as an optimal segmentation position; segmenting the character line candidate region based on the segmentation point template and
(Continued)

the optimal segmentation position to obtain multiple single character regions; and performing character recognition on each of the single character regions to obtain a corresponding recognition result.

14 Claims, 7 Drawing Sheets

(58) Field of Classification Search
USPC .................................... 382/173, 177, 209
See application file for complete search history.

(56) References Cited

U.S. PATENT DOCUMENTS

| | | | |
|---|---|---|---|
| 9,277,063 B2* | 3/2016 | Kido | H04N 1/00013 |
| 2004/0238619 A1* | 12/2004 | Nagasaka | G06K 9/2018 |
| | | | 235/379 |
| 2010/0202680 A1* | 8/2010 | Hamasaki | G06K 9/00 |
| | | | 382/137 |
| 2015/0356372 A1 | 12/2015 | Liang et al. | |
| 2016/0012288 A1* | 1/2016 | Goto | G06K 9/38 |
| | | | 382/137 |

FOREIGN PATENT DOCUMENTS

| | | |
|---|---|---|
| CN | 102750534 A | 10/2012 |
| CN | 103049750 A | 4/2013 |
| CN | 103390160 A | 11/2013 |
| CN | 104200204 A | 12/2014 |
| CN | 104616009 A | 5/2015 |
| EP | 1 085 456 B1 | 11/2006 |
| EP | 2 830 024 A1 | 1/2015 |
| RU | 2007 116 873 A | 11/2008 |

OTHER PUBLICATIONS

Wang, Temple Match Algorithm of Maximum Variance Between Clusters and License Plate Characters' Segmentation. Computer Engineering. Oct. 2006;32(19):193-4.

Russian 1st Office Action dated Aug. 6, 2018 for Application No. 2017131524/08(055274).

Extended European Search Report for Application No. EP 15881706.4 dated Jan. 24, 2018.

Feng et al., Extraction of Serial Numbers on Bank Notes. IEEE 12$^{th}$ International Conference on Document Analysis and Recognition. 2013;698-702.

* cited by examiner

CHARACTER SEGMENTATION AND RECOGNITION METHOD

The present application is a National Stage application of PCT international patent application PCT/CN2015/082438, filed on Jun. 26, 2015 which claims the priority to Chinese Patent Application No. 201510083858.3, titled "CHARACTER SEGMENTATION AND RECOGNITION METHOD", filed on Feb. 13, 2015 with the State Intellectual Property Office of the People's Republic of China, both of which are incorporated herein by reference in their entireties.

TECHNICAL FIELD

The present disclosure relates to the field of optical character recognition, and in particular to a character segmentation and recognition method.

BACKGROUND

Optical character recognition is to detect and recognize printed characters by electronic equipment. With the automation degree and intelligent degree of social production and livelihood becoming higher, OCR is more widely applied, such as a printing detection system on various packages, a plate number positioning and character recognition system in intelligent transportation, a crown word number recognition in banknote recognition, a serial number recognition in bill recognition and layout analyses in bill recognition. Therefore, developing an efficient optical character recognition system has great social benefits and economic benefits.

In practical applications, because of non-consistency of shooting scenes of an image and influences of various factors, such as sensors and illuminations, situations of complex image backgrounds, such as shading, seals and patterns always occur. A bottleneck of OCR is no longer a design of a classifier but mainly depends on the accuracy of character segmentation, and in particular to segmentation of adhered or broken character lines. Therefore, a more efficient character segmentation method should be proposed.

At present, a general character segmentation method is an image-based segmentation method, which includes regarding an initial point of an image as a candidate segmentation point, determining other effective segmentation points and screening a target segmentation point from the effective segmentation points. The method is to obtain the target segmentation point by using properties of a single character and to recognize a segmented character. However, the segmentation method has a low character recognition capability and a bad anti-dirty capability under a complex background.

SUMMARY

A character segmentation and recognition method is provided according to an embodiment of the present disclosure, for solving the problem of a low character recognition capability and a bad anti-dirty capability under a complex background in a conventional segmentation method.

A character segmentation and recognition method is provided according to an embodiment of the present disclosure, which includes:
collecting image data to obtain a to-be-recognized image;
positioning a character line candidate region on the to-be-recognized image;
obtaining pre-set character line prior information, where the character line prior information includes the number of characters, character spacing and a character size;
obtaining a corresponding segmentation point template based on the character line prior information;
obtaining credible degrees of different positions on the character line candidate region traversed by the segmentation point template;
determining a position with the highest credible degree as an optimal segmentation position;
segmenting the character line candidate region based on the segmentation point template and the optimal segmentation position to obtain multiple single character regions; and
performing character recognition on each of the single character regions to obtain a corresponding recognition result.

Optionally, the obtaining the pre-set character line prior information includes:
obtaining the pre-set character line prior information based on a type of the to-be-recognized image; or
obtaining the pre-set character line prior information based on an orientation feature of the character line candidate region.

Optionally, the obtaining the corresponding segmentation point template based on the character line prior information includes:
creating and initializing the segmentation point template based on the character line prior information; or
obtaining the corresponding segmentation point template based on the character line prior information and a pre-set segmentation index table, where the segmentation index table includes a correspondence between the character line prior information and the segmentation point template.

Optionally, the obtaining the credible degrees of different positions on the character line candidate region traversed by the segmentation point template includes:
recording position information of the character line candidate region traversed by the segmentation point template; and
obtaining the credible degrees corresponding to the position information.

Optionally, the obtaining the credible degrees corresponding to the position information includes:
obtaining the first number of first effective pixel points of the character line candidate region on a left boundary of a character segmentation point, where the segmentation point template includes multiple character segmentation points, each of the character segmentation points corresponds to one character on a character line, each of the character segmentation points includes the left boundary and a right boundary, and the first effective pixel points are pixel points with gray values in a pre-set first threshold range;
obtaining a first evaluation value based on the first number and a pre-set first weight;
obtaining the second number of second effective pixel points of the character line candidate region on the right boundary of the character segmentation point, where the second effective pixel points are pixel points with gray values in a pre-set second threshold range;
obtaining a second evaluation value based on the second number and a pre-set second weight;
obtaining the third number of third effective pixel points of the character line candidate region within the segmentation point template, where the third effective pixel points are pixel points with gray values in a pre-set third threshold range;

obtaining a third evaluation value based on the third number and a pre-set third weight; and obtaining the credible degrees corresponding to the position information based on the first evaluation value, the second evaluation value and the third evaluation value.

Optionally, after obtaining the corresponding segmentation point template based on the character line prior information, the method further includes:

obtaining a binary image of the to-be-recognized image;

obtaining a projection waveform of the binary image in a horizontal direction; and updating an upper boundary and a lower boundary of the segmentation point template based on the projection waveform.

Optionally, the updating the upper boundary and the lower boundary of the segmentation point template based on the projection waveform includes:

determining and updating the uppermost position at which a grey value is greater than a pre-set fourth threshold in the projection waveform as the upper boundary of the segmentation point template; and determining and updating the lowermost position at which a grey value is greater than a pre-set fifth threshold in the projection waveform as the lower boundary of the segmentation point template.

Optionally, the positioning the character line candidate region on the to-be-recognized image includes:

positioning a region of interest where a character line locates on the to-be-recognized image;

performing affine transformation and bilinear interpolation on the region of interest to obtain a correction image; and positioning the character line candidate region on the correction image.

Optionally, the performing character recognition on each of the single character regions to obtain the corresponding recognition result includes:

obtaining character feature data in the single character region; and performing character recognition based on the character feature data to obtain the recognition result.

Optionally, the character feature data is character contour feature data.

It may be seen from the above technical solutions that the embodiments of the present disclosure have the following advantages. In the embodiments of the present disclosure, image data is collected to obtain a to-be-recognized image; a character line candidate region is positioned on the to-be-recognized image; pre-set character line prior information is obtained, where the character line prior information includes the number of characters, character spacing and a character size; a corresponding segmentation point template is obtained based on the character line prior information; credible degrees of different positions on the character line candidate region traversed by the segmentation point template is obtained; a position with the highest credible degree is determined as an optimal segmentation position; the character line candidate region is segmented based on the segmentation point template and the optimal segmentation position to obtain multiple single character regions; and character recognition is performed on each of the single character regions to obtain a corresponding recognition result. In the embodiments of the present disclosure, the anti-dirty capability of the character segmentation method is improved by introducing a segmentation point template and determining an optimal segmentation position. Even under a complex background, the character segmentation and recognition method can still have a good recognition capability, thereby, improving the efficiency of character recognition.

BRIEF DESCRIPTION OF THE DRAWINGS

Each of FIG. 5a and FIG. 5b is a schematic diagram of a positioned character line candidate region according to an embodiment of the present disclosure.

Each of FIG. 7b

Each of FIG. 9a and FIG. 9b is a schematic diagram of the character segmentation effect in a character segmentation and recognition method according to an embodiment of the present disclosure.

DETAILED DESCRIPTION OF THE EMBODIMENTS

A character segmentation and recognition method is provided according to an embodiment of the present disclosure, for solving the problem of a low character recognition capability and a bad anti-dirty capability under a complex background in a conventional segmentation method.

In order to make the objects, features and advantages of the present disclosure clearer and easier to be understood, hereinafter technical solutions of the embodiments of the present disclosure are illustrated clearly and completely in conjunction with drawings of the embodiments of the present disclosure. Apparently, the described embodiments are merely a few rather than all of the embodiments of the present disclosure. All other embodiments obtained by persons of ordinary skill in the art based on the embodiments of the present disclosure without creative efforts shall fall within the protection scope of the present disclosure.

Figure 1:
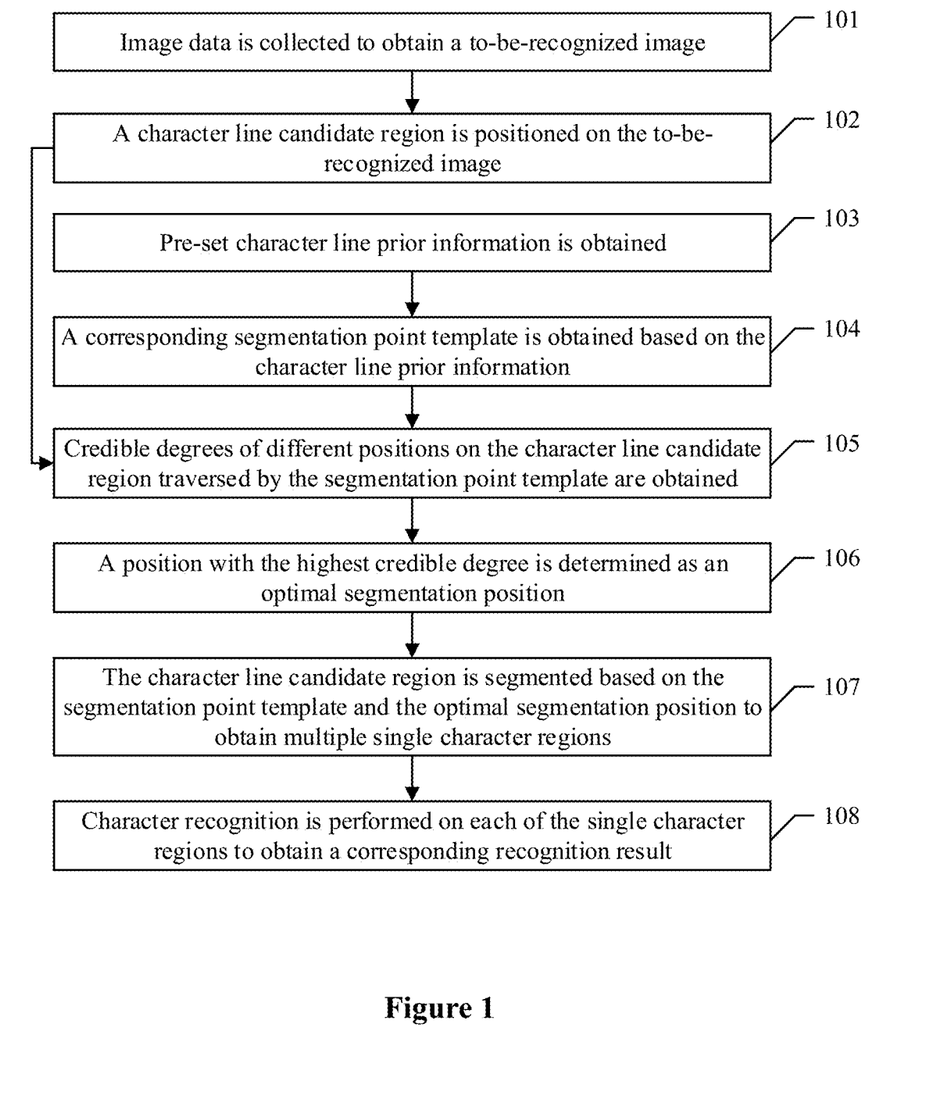
FIG. 1 is a flow chart of a character segmentation and recognition method according to a first embodiment of the present disclosure.

Reference is made to FIG. 1, a character segmentation and recognition method according to a first embodiment of the present disclosure includes steps 101 to 108.

In step 101, image data is collected to obtain a to-be-recognized image.

First, the image data is collected to obtain the to-be-recognized image.

In step 102, a character line candidate region is positioned on the to-be-recognized image.

After the to-be-recognized image is obtained, the character line candidate region may be positioned on the to-be-recognized image.

In step 103, pre-set character line prior information is obtained.

In addition, the pre-set character line prior information may be obtained. The character line prior information includes the number of characters, character spacing and a character size.

In step 104, a corresponding segmentation point template is obtained based on the character line prior information.

After the pre-set character line prior information is obtained, the corresponding segmentation point template may be obtained based on the character line prior information.

In step 105, credible degrees of different positions on the character line candidate region traversed by the segmentation point template are obtained.

After the corresponding segmentation point template is obtained based on the character line prior information, the credible degrees of different positions on the character line candidate region traversed by the segmentation point template may be obtained.

In step 106, a position with the highest credible degree is determined as an optimal segmentation position.

After the credible degrees of different positions are obtained, the position with the highest credible degree may be determined as the optimal segmentation position.

In step 107, the character line candidate region is segmented based on the segmentation point template and the optimal segmentation position to obtain multiple single character regions.

After the position with the highest credible degree is determined as the optimal segmentation position, the character line candidate region may be segmented based on the segmentation point template and the optimal segmentation position to obtain multiple single character regions.

In step 108, character recognition is performed on each of the single character regions to obtain a corresponding recognition result.

After multiple single character regions are obtained, character recognition may be performed on each of the single character regions to obtain the corresponding recognition result.

In the embodiments of the present disclosure, image data is collected to obtain a to-be-recognized image; a character line candidate region is positioned on the to-be-recognized image; pre-set character line prior information is obtained, where the character line prior information includes the number of characters, character spacing and a character size; a corresponding segmentation point template is obtained based on the character line prior information; credible degrees of different positions on the character line candidate region traversed by the segmentation point template is obtained; a position with the highest credible degree is determined as an optimal segmentation position; the character line candidate region is segmented based on the segmentation point template and the optimal segmentation position to obtain multiple single character regions; and character recognition is performed on each of the single character regions to obtain a corresponding recognition result. In the embodiments of the present disclosure, the anti-dirty capability of the character segmentation method is improved by introducing a segmentation point template and determining an optimal segmentation position. Even under a complex background, the character segmentation and recognition method can still have a good recognition capability, thereby, improving the efficiency of character recognition.

Figure 2:
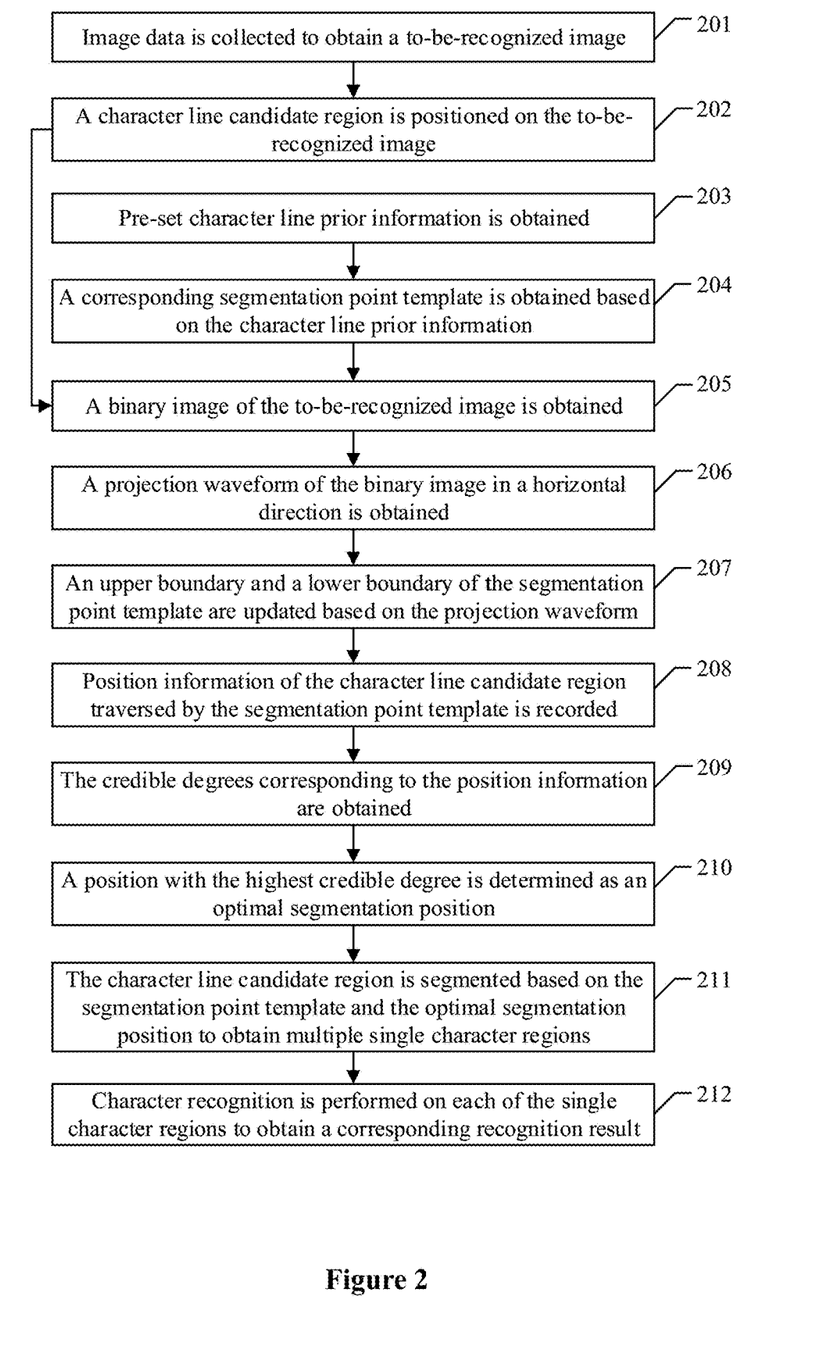
FIG. 2 is a flow chart of a character segmentation and recognition method according to a second embodiment of the present disclosure.

For ease of understanding, hereinafter the character segmentation and recognition method according to the embodiments of the present disclosure is described in detail. Reference is made to FIG. 2, a character segmentation and recognition method according to a second embodiment of the present disclosure includes steps 201 to 212.

In step 201, image data is collected to obtain a to-be-recognized image.

First, the image data is collected to obtain the to-be-recognized image. The image data may be from banknotes, tickets, bills, package printings, book layouts, etc.

In step 202, a character line candidate region is positioned on the to-be-recognized image.

After the to-be-recognized image is obtained, the character line candidate region may be positioned on the to-be-recognized image. It may be understood that, if a type or a source of the to-be-recognized image is known in advance, it is easy to position a position of a character line to be recognized. For example, if the to-be-recognized image is the front of a banknote (Renminbi), a position of the character line candidate region is a position of banknote code numbers, which are located in the lower left corner of the to-be-recognized image.

In step 203, pre-set character line prior information is obtained.

In addition, the pre-set character line prior information may be obtained. The character line prior information includes the number of characters, character spacing and a character size. Specifically, the pre-set character line prior information may be obtained, based on a type of the to-be-recognized image, or based on an orientation feature of the character line candidate region.

It should be noted that, in a case that the type of the to-be-recognized image is known, the specification of the character line is fixed, that is, the number of characters, the character spacing and the character size are fixed. Therefore, the corresponding character line prior information can be obtained. For example, if the to-be-recognized image is the front of a banknote, the character line is banknote code numbers, and the character line prior information of the banknote code numbers is inherent and may be set in a system in advance. In addition, in a case that the orientation feature of the character line candidate region is known, the corresponding character line prior information can also be easily obtained. For example, character lines, such as "invoice code number", "invoice number" and "order number", exist on an invoice, if the orientation feature of the character line candidate region is known, an approximate position where the character line locates on the whole to-be-recognized image is known, that is, to which types of "invoice code number", "invoice number" and "order number" the character line belongs may be known, thus, the corresponding character line prior information may be obtained.

In step 204, a corresponding segmentation point template is obtained based on the character line prior information.

After the pre-set character line prior information is obtained, the corresponding segmentation point template may be obtained based on the character line prior information. Specifically, the segmentation point template is created and initialized based on the character line prior information. Alternatively, the corresponding segmentation point template is obtained based on the character line prior information and a pre-set segmentation index table, and the segmentation index table includes a correspondence between the character line prior information and the segmentation point template.

It should be noted that, if a segmentation point template is created and initialized based on the character line prior information, the character line prior information includes the number of characters, the character spacing and the character size, it is easy to obtain a length and a height of the segmentation point template and the corresponding segmentation point template is created. Alternatively, each character segmentation point corresponding to each character in the character line prior information is created, and a segmentation point template is obtained by arranging all character segmentation points in order in the character line prior information. The character size may be known from the character line prior information, and the character size includes a height and a width of a character. Therefore, a left boundary and a right boundary, and an upper boundary and a lower boundary of each character segmentation point can be defined. The character segmentation points are arranged in order, based on the character spacing, to enable the created segmentation point template to correspond to the character line prior information.

It should be noted that, in a case that a segmentation point template is obtained based on the character line prior information and a pre-set segmentation index table, the segmentation index table is set in a system in advance, and a segmentation point template corresponding to the character line prior information may also be stored in the system in advance. Therefore, the segmentation index table and the segmentation point template can be directly inquired and invoked when required.

In step 205, a binary image of the to-be-recognized image is obtained.

After the to-be-recognized image is obtained, the binary image of the to-be-recognized image may be obtained. Specifically, values of pixel points in the to-be-recognized image which are greater than a pre-set threshold are defined as 1, values of pixel points in the to-be-recognized image which are less than the pre-set threshold are defined as 0, and the binary image may be obtained.

In step 206, a projection waveform of the binary image in a horizontal direction is obtained.

After the binary image of the to-be-recognized image is obtained, the projection waveform of the binary image in a horizontal direction may be obtained.

In step 207, an upper boundary and a lower boundary of the segmentation point template are updated based on the projection waveform.

After the projection waveform of the binary image in a horizontal direction is obtained, the upper boundary and the lower boundary of the segmentation point template may be updated based on the projection waveform. Specifically, the uppermost position at which a grey value is greater than a pre-set fourth threshold in the projection waveform is determined and updated as the upper boundary of the segmentation point template; and the lowermost position at which a grey value is greater than a pre-set fifth threshold in the projection waveform is determined and updated as the lower boundary of the segmentation point template, which enables the upper boundary and the lower boundary of the segmentation point template to be nearer to the character line, thereby, providing guarantees to subsequent anti-dirty segmentation and accurate character recognition.

In step 208, position information of the character line candidate region traversed by the segmentation point template is recorded.

After the segmentation point template is determined, the position information of the character line candidate region traversed by the segmentation point template may be recorded. It may be understood that, the segmentation point template may slide on the character line candidate region until the whole character line candidate region is traversed. During traversing, the segmentation point template may occur on all positions of the character line candidate region, and different position information is generated for different positions correspondingly.

In step 209, the credible degrees corresponding to the position information are obtained.

After the position information of the character line candidate region traversed by the segmentation point template is recorded, the credible degrees corresponding to the position information may be obtained.

It should be noted that, the method of obtaining the credible degrees in the embodiment includes:

obtaining the first number of first effective pixel points of the character line candidate region on a left boundary of a character segmentation point, where the segmentation point template includes multiple character segmentation points, each of the character segmentation points corresponds to one character on a character line, each of the character segmentation points includes the left boundary and a right boundary, and the first effective pixel points are pixel points with gray values in a pre-set first threshold range;

obtaining a first evaluation value based on the first number and a pre-set first weight;

obtaining the second number of second effective pixel points of the character line candidate region on the right boundary of the character segmentation point, where the second effective pixel points are pixel points with gray values in a pre-set second threshold range;

obtaining a second evaluation value based on the second number and a pre-set second weight;

obtaining the third number of third effective pixel points of the character line candidate region within the segmentation point template, where the third effective pixel points are pixel points with gray values in a pre-set third threshold range;

obtaining a third evaluation value based on the third number and a pre-set third weight; and obtaining the credible degrees corresponding to the position information based on the first evaluation value, the second evaluation value and the third evaluation value.

The first evaluation value, the second evaluation value and the third evaluation value are respectively obtained by introducing the first weight, the second weight and the third weight, and the credible degrees corresponding to the position information are obtained by synthesizing the first evaluation value, the second evaluation value and the third evaluation value, which enables the credible degrees to reflect the segmentation accuracy and the anti-dirty capability of the segmentation point template corresponding to the position information of the character line candidate region more exactly and efficiently.

In step 210, a position with the highest credible degree is determined as an optimal segmentation position.

After the credible degrees of different positions are obtained, the position with the highest credible degree may be determined as the optimal segmentation position.

In step 211, the character line candidate region is segmented based on the segmentation point template and the optimal segmentation position to obtain multiple single character regions.

After the position with the highest credible degree is determined as the optimal segmentation position, the character line candidate region may be segmented based on the segmentation point template and the optimal segmentation position to obtain multiple single character regions.

In step 212, character recognition is performed on each of the single character regions to obtain a corresponding recognition result.

After multiple single character regions are obtained, character recognition may be performed on each of the single character regions to obtain the corresponding recognition result.

In the embodiment, the first evaluation value, the second evaluation value and the third evaluation value are respectively obtained by introducing the first weight, the second weight and the third weight, and the credible degrees corresponding to the position information are obtained by synthesizing the first evaluation value, the second evaluation value and the third evaluation value, which enables the credible degrees to reflect the segmentation accuracy and the anti-dirty capability of the segmentation point template corresponding to the position information of the character line candidate region more exactly and efficiently.

Furthermore, the projection waveform of the binary image of the to-be-recognized image is obtained, and the upper boundary and the lower boundary of the segmentation point template are updated based on the projection waveform, which enables the upper boundary and the lower boundary of the segmentation point template to be nearer to the character line, thereby, providing guarantees to subsequent anti-dirty segmentation and accurate character recognition.

Figure 3:
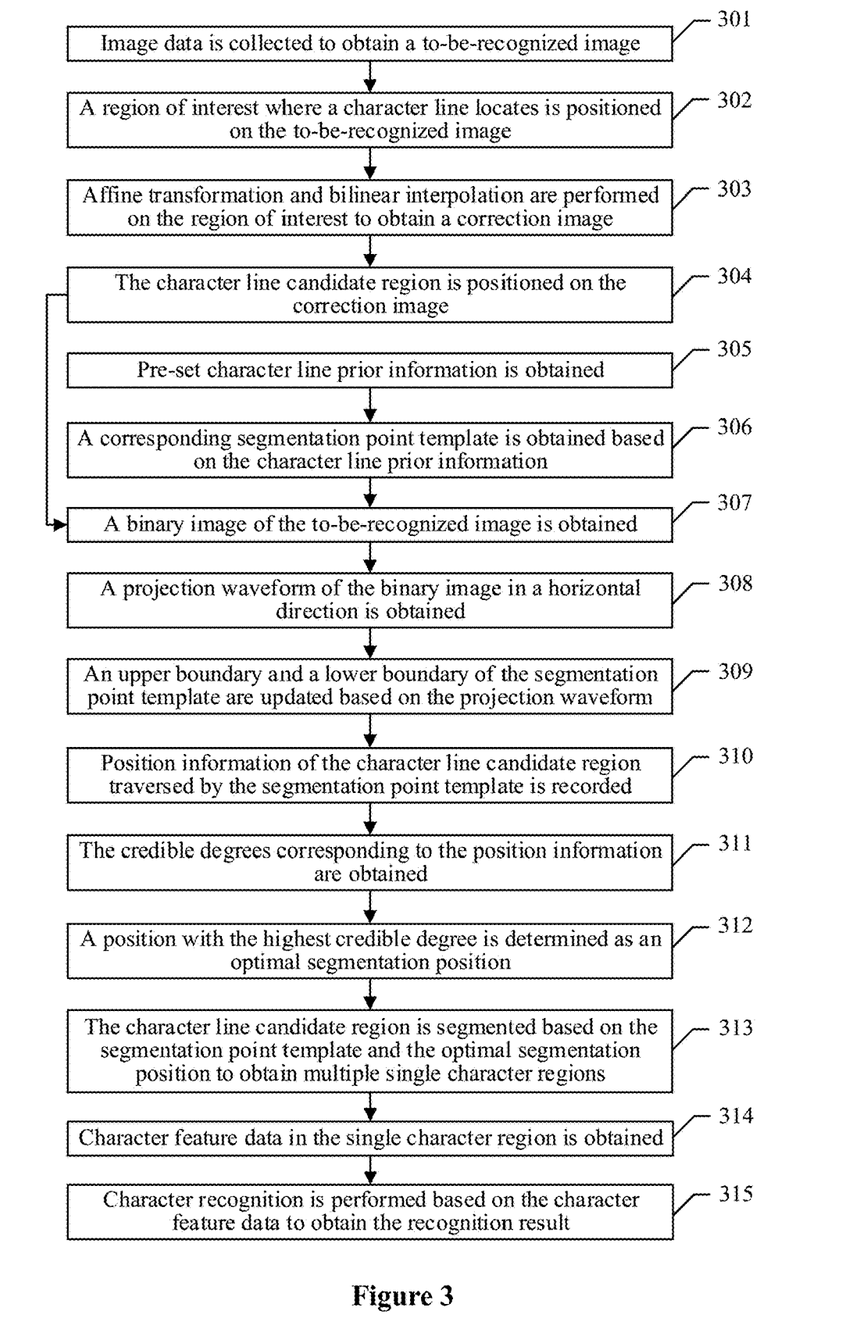
FIG. 3 is a flow chart of a character segmentation and recognition method according to a third embodiment of the present disclosure.

The character segmentation and recognition method is described in the above second embodiment in an aspect of improving the anti-dirty capability, and hereinafter the character segmentation and recognition method is described in detail in another aspect. Reference is made to FIG. 3, a character segmentation and recognition method according to a third embodiment of the present disclosure includes step 301 to 315.

In step 301, image data is collected to obtain a to-be-recognized image.

First, the image data is collected to obtain the to-be-recognized image. The image data may be from banknotes, tickets, bills, package printings, book layouts, etc.

In step 302, a region of interest where a character line locates is positioned on the to-be-recognized image.

After the to-be-recognized image is obtained, the region of interest where the character line locates may be positioned on the to-be-recognized image. It may be understood that, if a type or a source of the to-be-recognized image is known in advance, it is easy to position a position of a character line to be recognized. For example, if the to-be-recognized image is the front of a banknote (Renminbi), a position of the character line candidate region is a position of banknote code numbers, which are located in the lower left corner of the to-be-recognized image.

It should be noted that, the region of interest may be roughly positioned on the to-be-recognized image, and fine positioning is not required, as long as an approximate position of the character line can be quickly positioned.

In step 303, affine transformation and bilinear interpolation are performed on the region of interest to obtain a correction image.

After the region of interest is positioned, affine transformation and bilinear interpolation may be performed on the region of interest to obtain the correction image. It may be understood that, the correction image generated by performing affine transformation and bilinear interpolation is more conducive to character segmentation and recognition.

In step 304, the character line candidate region is positioned on the correction image.

After the correction image is obtained, the character line candidate region may be positioned on the correction image. It should be noted that, the positioning the character line candidate region on the correction image should be fine positioning, that is, the positioning should be exact, and a case that the character line candidate region just covers a character line required to be recognized is better, to reduce the time of adjusting the segmentation point template in subsequent steps. Therefore, the efficiency is improved.

In step 305, pre-set character line prior information is obtained.

In addition, the pre-set character line prior information may be obtained. The character line prior information includes the number of characters, character spacing and a character size. Specifically, the pre-set character line prior information may be obtained, based on a type of the to-be-recognized image, or based on an orientation feature of the character line candidate region.

It should be noted that, in a case that the type of the to-be-recognized image is known, the specification of the character line is fixed, that is, the number of characters, the character spacing and the character size are fixed. Therefore, the corresponding character line prior information can be obtained. For example, if the to-be-recognized image is the front of a banknote, the character line is banknote code numbers, and the character line prior information of the banknote code numbers is inherent and may be set in a system in advance. In addition, in a case that the orientation feature of the character line candidate region is known, the corresponding character line prior information can also be easily obtained. For example, character lines, such as "invoice code number", "invoice number" and "order number", exist on an invoice, if the orientation feature of the character line candidate region is known, an approximate position where the character line locates on the whole to-be-recognized image is known, that is, to which types of "invoice code number", "invoice number" and "order number" the character line belongs may be known, thus, the corresponding character line prior information may be obtained.

In step 306, a corresponding segmentation point template is obtained based on the character line prior information.

After the pre-set character line prior information is obtained, the corresponding segmentation point template may be obtained based on the character line prior information. Specifically, the segmentation point template is created and initialized based on the character line prior information. Alternatively, the corresponding segmentation point template is obtained based on the character line prior information and a pre-set segmentation index table, and the segmentation index table includes a correspondence between the character line prior information and the segmentation point template.

It should be noted that, if a segmentation point template is created and initialized based on the character line prior information, the character line prior information includes the number of characters, the character spacing and the character size, it is easy to obtain a length and a height of the segmentation point template and the corresponding segmentation point template is created. Alternatively, each character segmentation point corresponding to each character in the character line prior information is created, and a segmentation point template is obtained by arranging all character segmentation points in order in the character line prior information. The character size may be known from the character line prior information, and the character size includes a height and a width of a character. Therefore, a left boundary and a right boundary, and an upper boundary and a lower boundary of each character segmentation point can be defined. The character segmentation points are arranged in order, based on the character spacing, to enable the created segmentation point template to correspond to the character line prior information.

It should be noted that, in a case that a segmentation point template is obtained based on the character line prior information and a pre-set segmentation index table, the segmentation index table is set in a system in advance, and a segmentation point template corresponding to the character line prior information may also be stored in the system in advance. Therefore, the segmentation index table and the segmentation point template can be directly inquired and invoked when required.

In step 307, a binary image of the to-be-recognized image is obtained.

After the to-be-recognized image is obtained, the binary image of the to-be-recognized image may be obtained. Specifically, values of pixel points in the to-be-recognized image which are greater than a pre-set threshold are defined as 1, values of pixel points in the to-be-recognized image which are less than the pre-set threshold are defined as 0, and the binary image may be obtained.

In step 308, a projection waveform of the binary image in a horizontal direction is obtained.

After the binary image of the to-be-recognized image is obtained, the projection waveform of the binary image in a horizontal direction may be obtained.

In step 309, an upper boundary and a lower boundary of the segmentation point template are updated based on the projection waveform.

After the projection waveform of the binary image in a horizontal direction is obtained, the upper boundary and the lower boundary of the segmentation point template may be updated based on the projection waveform. Specifically, the uppermost position at which a grey value is greater than a pre-set fourth threshold in the projection waveform is determined and updated as the upper boundary of the segmentation point template; and the lowermost position at which a grey value is greater than a pre-set fifth threshold in the projection waveform is determined and updated as the lower boundary of the segmentation point template, which enables the upper boundary and the lower boundary of the segmentation point template to be nearer to the character line, thereby, providing guarantees to subsequent anti-dirty segmentation and accurate character recognition.

It should be noted that, alternately, an upper boundary and a lower boundary may be determined by comparing a gradient of the projection waveform with the fourth threshold or the fifth threshold. For example, the uppermost position at which a gradient is greater than the pre-set fourth threshold in the projection waveform is determined and updated as the upper boundary of the segmentation point template; and the lowermost position at which a gradient is greater than the pre-set fifth threshold in the projection waveform is determined and updated as the lower boundary of the segmentation point template.

In step 310, position information of the character line candidate region traversed by the segmentation point template is recorded.

After the segmentation point template is determined, the position information of the character line candidate region traversed by the segmentation point template may be recorded. It may be understood that, the segmentation point template may slide on the character line candidate region until the whole character line candidate region is traversed. During traversing, the segmentation point template may occur on all positions of the character line candidate region, and different position information is generated for different positions correspondingly.

In step 311, the credible degrees corresponding to the position information are obtained.

After the position information of the character line candidate region traversed by the segmentation point template is recorded, the credible degrees corresponding to the position information may be obtained.

It should be noted that, the method of obtaining the credible degrees in the embodiment includes:

obtaining the first number of first effective pixel points of the character line candidate region on a left boundary of a character segmentation point, where the segmentation point template includes multiple character segmentation points, each of the character segmentation points corresponds to one character on a character line, each of the character segmentation points includes the left boundary and a right boundary, and the first effective pixel points are pixel points with gray values in a pre-set first threshold range;

obtaining a first evaluation value based on the first number and a pre-set first weight;

obtaining the second number of second effective pixel points of the character line candidate region on the right boundary of the character segmentation point, where the second effective pixel points are pixel points with gray values in a pre-set second threshold range;

obtaining a second evaluation value based on the second number and a pre-set second weight;

obtaining the third number of third effective pixel points of the character line candidate region within the segmentation point template, where the third effective pixel points are pixel points with gray values in a pre-set third threshold range;

obtaining a third evaluation value based on the third number and a pre-set third weight; and obtaining the credible degrees corresponding to the position information based on the first evaluation value, the second evaluation value and the third evaluation value.

The first evaluation value, the second evaluation value and the third evaluation value are respectively obtained by introducing the first weight, the second weight and the third weight, and the credible degrees corresponding to the position information are obtained by synthesizing the first evaluation value, the second evaluation value and the third evaluation value, which enables the credible degrees to reflect the segmentation accuracy and the anti-dirty capability of the segmentation point template corresponding to the position information of the character line candidate region more exactly and efficiently.

It should be noted that, in the embodiment, the first effective pixel points, the second effective pixel points and the third effective pixel points may respectively be pixel points with gradients in the pre-set first threshold range, the pre-set second threshold range and the pre-set third threshold range.

In step 312, a position with the highest credible degree is determined as an optimal segmentation position.

After the credible degrees of different positions are obtained, the position with the highest credible degree may be determined as the optimal segmentation position.

In step 313, the character line candidate region is segmented based on the segmentation point template and the optimal segmentation position to obtain multiple single character regions.

After the position with the highest credible degree is determined as the optimal segmentation position, the character line candidate region may be segmented based on the segmentation point template and the optimal segmentation position to obtain multiple single character regions.

In step 314, character feature data in the single character region is obtained.

After multiple single character regions are obtained, the character feature data in each of the single character regions may be obtained. The character feature data may be character contour feature data.

In step 315, character recognition is performed based on the character feature data to obtain a recognition result.

After character feature data in the single character region is obtained, character recognition may be performed based on the character feature data to obtain the recognition result.

In the embodiment, a correction image is obtained by performing affine transformation and bilinear interpolation, which provides a supportive environment to character segmentation and recognition, reduces the time of adjusting the segmentation point template in subsequent steps and improves the efficiency of segmentation and recognition.

For ease of understanding, hereinafter a practical application scenario of the character segmentation and recognition method according to the embodiments of the present disclosure is described, based on the third embodiment in FIG. 3.

Figure 4:
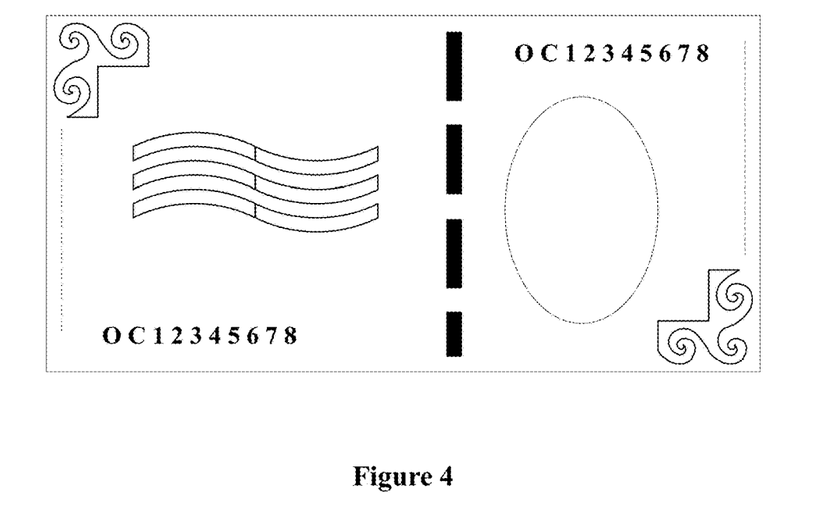
FIG. 4 is a schematic diagram of a to-be-recognized image according to an embodiment of the present disclosure.
Figure 5A:
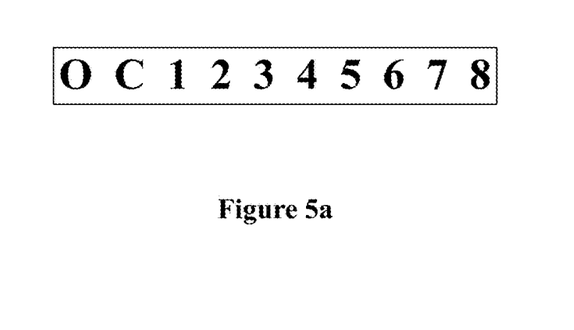
Figure 5B:
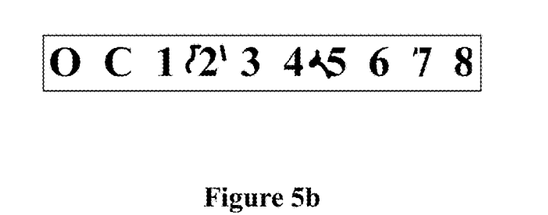

Firstly, image data is collected to obtain data of an original image. A to-be-recognized image is shown in FIG. 4. As shown in FIG. 4, a region of interest R(r,c) here a character line locates is quickly positioned on the collected original image. Affine transformation and bilinear interpolation are performed on the region of interest R(r,c) obtain a correction image $p_{bi}(r,c)$. As shown in FIG. 5a and FIG. 5b, a character region is exactly positioned on the correction image to obtain a character line candidate region $p_{candidate}(r,c)$.

Figure 6:
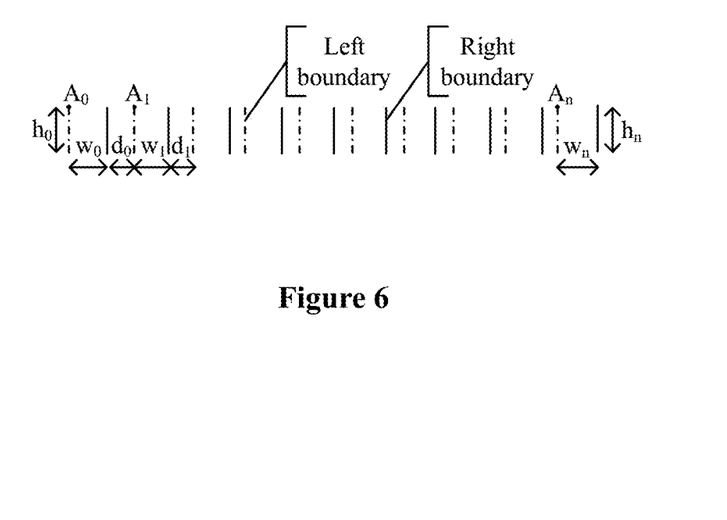
FIG. 6 is a schematic structural diagram of a segmentation point template according to an embodiment of the present disclosure.

As shown in FIG. 6, a segmentation point template $M=(m_0, m_1, m_2, \ldots m_{2i-1})$ is created and initialized based on the character line prior information, where $i \in [1,N]$, N is the number of characters included in the character line, $m_{2(i-1)}$ and $m_{2(i-1)+1}$ represent a horizontal axis of a left boundary and a right boundary of a character segmentation point respectively. The number and coordinates of vertexes A and the size of hn and wn in the segmentation point template are determined by the character size. The segmentation point template in FIG. 6 corresponds to the character line in FIG. 5a or FIG. 5b in a one-to-one manner and is stored in a memory.

Data of each pixel point on the character line candidate region $p_{candidate}(r,c)$ whose value is greater than a given threshold is set to be 1, and data of each pixel point on the character line candidate region $p_{candidate}(r,c)$ whose value is less than a given threshold is set to be 0. Therefore, a binary image $p_{binary}(r,c)$ obtained.

Figure 7A:
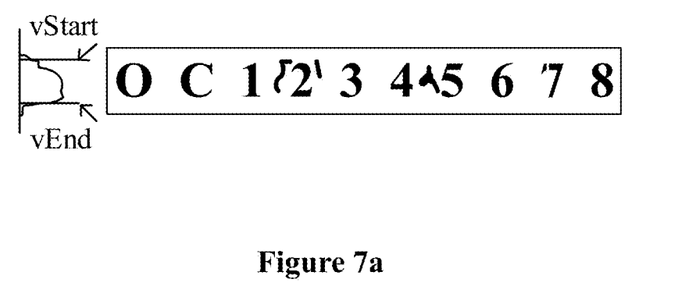
FIG. 7a is a schematic diagram of an upper boundary and a lower boundary of a segmentation point template before the upper boundary and the lower boundary are updated.
Figure 7B:
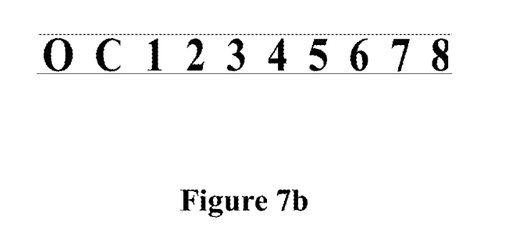
Figure 7C:
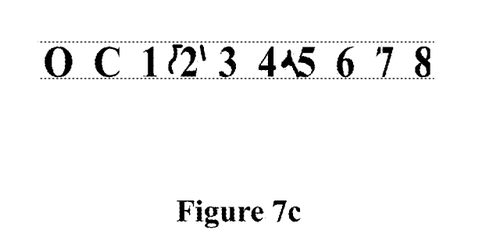
FIG. 7c is a schematic diagram of an upper boundary and a lower boundary of a segmentation point template after the upper boundary and the lower boundary are updated.

A upper boundary box vStart and a lower boundary box vEnd (as shown in FIG. 7a, FIG. 7b and FIG. 7c) of characters are computed based on the binary image $p_{binary}(r,c)$. A position at the top of a projection waveform at which a grey value is greater than a given threshold Tw is determined as an initial position of the upper boundary, and a position at the bottom of the projection waveform at which a grey value is greater than the given threshold Tw is determined as the end position of the lower boundary.

Positions pos(r,c) of the character line candidate region $p_{candidate}(r,c)$ traversed by the segmentation point template are recorded.

A credible degree corresponding to the position pos(r,c) are obtained. The credible degree is computed based on a synthesis of a first evaluation value, a second evaluation value and a third evaluation value. The detailed process of computing the credible degree includes:

in the character line candidate region $p_{candidate}(r,c)$, regarding pixel points on the left boundary of the character segmentation point in a vertical direction as first characteristic attribute points, and obtaining a first evaluation value eValue1 by multiplying the number N1 of the first characteristic attribute points with grey values in a given threshold T1 by a given weight w1, namely, $eValue1=N1 \times w1$; regarding pixel points on the right boundary of the character segmentation point in a vertical direction as second characteristic attribute points, and obtaining a second evaluation value eValue2 by multiplying the number N2 of the second characteristic attribute points with grey values in a given threshold T2 by a given weight w2, namely, $eValue2=N2 \times w2$; regarding pixel points of the character line candidate region within the segmentation point template as third characteristic attribute points, and obtaining a third evaluation value eValue3 by multiplying the number N3 of the third characteristic attribute points with grey values in a given threshold T3 by a given weight w3, namely, $eValue3=N3 \times w3$; and accumulating the first evaluation value, the second evaluation value and the third evaluation value to obtain a credible degree Ccur of the segmentation point template at the current position, namely, $Ccur=eValue1+eValue2+eValue3$.

After credible degrees corresponding to all the positions pos(r,c) are obtained, a position with the highest credible degree is determined as an optimal segmentation position.

Figure 8:
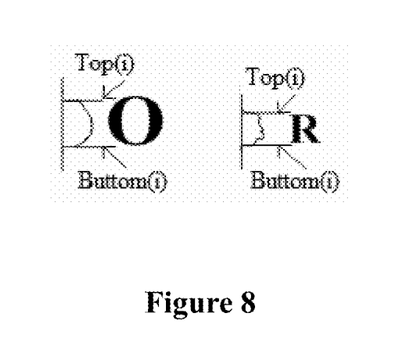
FIG. 8 is a schematic diagram of exactly positioning all characters on a segmentation point template by using a projection waveform.
Figure 9A:
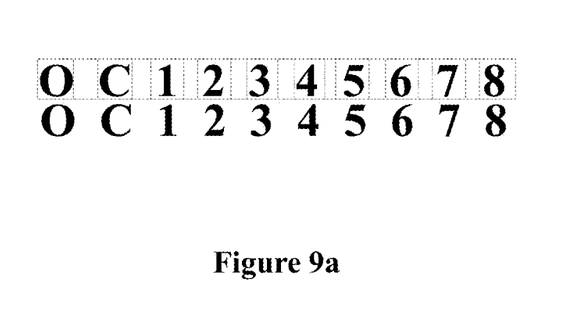
Figure 9B:
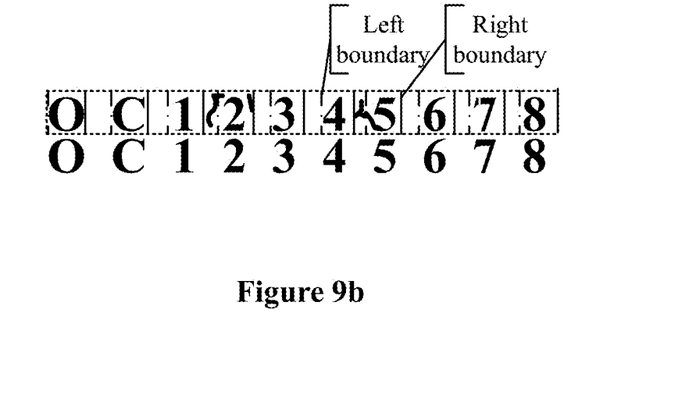
Figure 10:
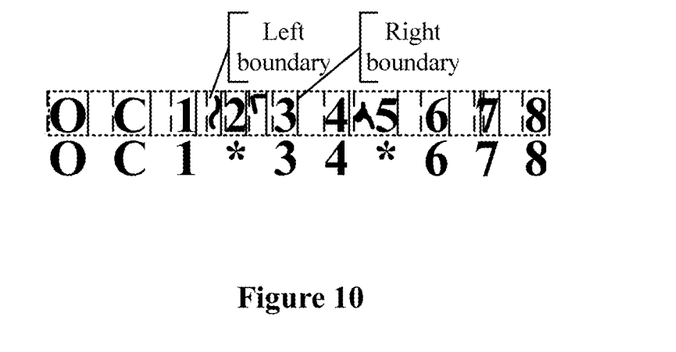
FIG. 10 is a schematic diagram of the character segmentation effect in a conventional method.

The projection waveform of each character is obtained based on the optimal segmentation position M in conjunction with horizontal projection of the binary image $p_{binary}(r,c)$. As shown in FIG. 8, a position where a grey value of a pixel point on the top of the projection waveform of the i-th character is firstly greater than a given threshold Tm is recorded and saved in Top(i), and a position where a grey value of a pixel point on the bottom of the projection waveform of the i-th character is firstly greater than a given threshold Tm is recorded and saved in Buttom(i). In such way, an exact position of each character is obtained. As shown in FIG. 9a and FIG. 9b, a single character region segmented according to the method is exact, a character 2 interfered by dirty, an adhered character 5 and a broken character 7 are all well segmented and recognized. Compared to the segmentation effect and the recognition result of a conventional method shown in FIG. 10, the segmentation effect in the method is significantly improved.

A single character is segmented based on the above final segmentation point position, and feature data of the single character is computed. The feature data may be but not limit to a character contour feature.

The single character is recognized based on the feature data of the single character.

In view of above, since the character line prior information is taken into full consideration in the present disclosure, interferences of complex situations, such as a dirty character, an adhered character and a broken character, are overcome by introducing a candidate segmentation point template, which can quickly segment characters, thereby, improving the efficiency of character recognition.

It may be clearly understood by those skilled in the art, for ease and simple of description, the detailed operating process of the above systems, devices and units may refer to the corresponding process in the method embodiments, which is not repeated herein.

The above embodiments are only intended to illustrate but not to limit the technical solutions of the present disclosure. Even though the present disclosure is illustrated in detail referring to the above embodiments, it should be understood by those skilled in the art, the technical solutions according to the above embodiments can be modified, or some technical features in the technical solutions can be substituted by equivalents; and those modifications or substitutes do not make the essence of the technical solutions depart from the spirit and scope of the technical solutions according to the embodiments of the present disclosure.

The invention claimed is:

1. A character segmentation and recognition method, comprising:
    collecting image data to obtain a to-be-recognized image;
    positioning a character line candidate region on the to-be-recognized image, wherein the character line candidate region comprises a plurality of characters which do not overlap with each other;
    obtaining pre-set character line prior information, wherein the character line prior information comprises a quantity of the plurality of characters, a spacing among the plurality of characters, and a size of the plurality of characters;
    obtaining a segmentation point template based on the character line prior information, wherein the segmentation point template comprises boundary frames of each of the plurality of characters;
    traversing the segmentation point template within the character line candidate region, to obtain credible degrees of different positions in the character line candidate region;
    determining an optimal segmentation position from the different positions, wherein the credible degree of the optimal segmentation position is largest among the credible degrees of the different positions;
    segmenting the character line candidate region based on the segmentation point template and the optimal segmentation position to obtain a plurality of single-character regions which do not overlap with each other, wherein each of the plurality of single-character regions comprises one of the plurality of characters; and
    performing character recognition on each of the plurality of single-character regions to obtain a corresponding recognition result;
    wherein traversing the segmentation point template within the character line candidate region, to obtain credible degrees of different positions in the character line candidate region comprises:
        recording position information of the segmentation point template, in response to the segmentation point being traversed to each of the different positions; and
        obtaining the credible degrees corresponding to the position information; and
    wherein the obtaining the credible degrees corresponding to the position information comprises:
        obtaining the first number of first effective pixel points of the character line candidate region on a left boundary of a character segmentation point, wherein the segmentation point template comprises a plurality of character segmentation points, each of the character segmentation points corresponds to one character on a character line, each of the character segmentation points comprises the left boundary and a right boundary, and the first effective pixel points are pixel points with gray values in a pre-set first threshold range;
        obtaining a first evaluation value based on the first number and a pre-set first weight;
        obtaining the second number of second effective pixel points of the character line candidate region on the right boundary of the character segmentation point, wherein the second effective pixel points are pixel points with gray values in a pre-set second threshold range;
        obtaining a second evaluation value based on the second number and a pre-set second weight;
        obtaining the third number of third effective pixel points of the character line candidate region within the segmentation point template, wherein the third effective pixel points are pixel points with gray values in a pre-set third threshold range;
        obtaining a third evaluation value based on the third number and a pre-set third weight; and
        obtaining the credible degrees corresponding to the position information based on the first evaluation value, the second evaluation value and the third evaluation value.

2. The method according to claim 1, wherein the obtaining the pre-set character line prior information comprises:
    obtaining the pre-set character line prior information based on a type of the to-be-recognized image; or
    obtaining the pre-set character line prior information based on an orientation feature of the character line candidate region.

3. The method according to claim 2, wherein after obtaining the corresponding segmentation point template based on the character line prior information, the method further comprises:
    obtaining a binary image of the to-be-recognized image;
    obtaining a projection waveform of the binary image in a horizontal direction; and
    updating an upper boundary and a lower boundary of the segmentation point template based on the projection waveform.

4. The method according to claim 2, wherein the positioning the character line candidate region on the to-be-recognized image comprises:
    positioning a region of interest where a character line locates on the to-be-recognized image;
    performing affine transformation and bilinear interpolation on the region of interest to obtain a correction image; and
    positioning the character line candidate region on the correction image.

5. The method according to claim 2, wherein the performing character recognition on each of the single character regions to obtain the corresponding recognition result comprises:
    obtaining character feature data in the single character region; and
    performing character recognition based on the character feature data to obtain the recognition result.

6. The method according to claim 1, wherein the obtaining the corresponding segmentation point template based on the character line prior information comprises:
- creating and initializing the segmentation point template based on the character line prior information; or
- obtaining the corresponding segmentation point template based on the character line prior information and a pre-set segmentation index table, wherein the segmentation index table comprises a correspondence between the character line prior information and the segmentation point template.

7. The method according to claim 6, wherein after obtaining the corresponding segmentation point template based on the character line prior information, the method further comprises:
- obtaining a binary image of the to-be-recognized image;
- obtaining a projection waveform of the binary image in a horizontal direction; and
- updating an upper boundary and a lower boundary of the segmentation point template based on the projection waveform.

8. The method according to claim 6, wherein the positioning the character line candidate region on the to-be-recognized image comprises:
- positioning a region of interest where a character line locates on the to-be-recognized image;
- performing affine transformation and bilinear interpolation on the region of interest to obtain a correction image; and
- positioning the character line candidate region on the correction image.

9. The method according to claim 6, wherein the performing character recognition on each of the single character regions to obtain the corresponding recognition result comprises:
- obtaining character feature data in the single character region; and
- performing character recognition based on the character feature data to obtain the recognition result.

10. The method according to claim 1, wherein after obtaining the corresponding segmentation point template based on the character line prior information, the method further comprises:
- obtaining a binary image of the to-be-recognized image;
- obtaining a projection waveform of the binary image in a horizontal direction; and
- updating an upper boundary and a lower boundary of the segmentation point template based on the projection waveform.

11. The method according to claim 10, wherein the updating the upper boundary and the lower boundary of the segmentation point template based on the projection waveform comprises:
- determining and updating the uppermost position at which a grey value is greater than a pre-set fourth threshold in the projection waveform as the upper boundary of the segmentation point template; and
- determining and updating the lowermost position at which a grey value is greater than a pre-set fifth threshold in the projection waveform as the lower boundary of the segmentation point template.

12. The method according to claim 1, wherein the positioning the character line candidate region on the to-be-recognized image comprises:
- positioning a region of interest where a character line locates on the to-be-recognized image;
- performing affine transformation and bilinear interpolation on the region of interest to obtain a correction image; and
- positioning the character line candidate region on the correction image.

13. The method according to claim 1, wherein the performing character recognition on each of the single character regions to obtain the corresponding recognition result comprises:
- obtaining character feature data in the single character region; and
- performing character recognition based on the character feature data to obtain the recognition result.

14. The method according to claim 13, wherein the character feature data is character contour feature data.

\* \* \* \* \*